N. Snow, Jr.,
Steering.

N°29,630.

Patented Aug. 14, 1860.

Witnesses.

Inventor.
Nathaniel Snow Jr.

UNITED STATES PATENT OFFICE.

NATHANIEL SNOW, JR., OF BOSTON, MASSACHUSETTS.

STEERING APPARATUS.

Specification of Letters Patent No. 29,630, dated August 14, 1860.

*To all whom it may concern:*

Be it known that I, NATHANIEL SNOW, Jr., of Boston, in the county of Suffolk and State of Massachusetts, have invented a new and useful Improvement in Steering Apparatus for Navigable Vessels; and I do hereby declare that the same is fully described and represented in the following specification and the accompanying drawings, of which—

Figure 2:
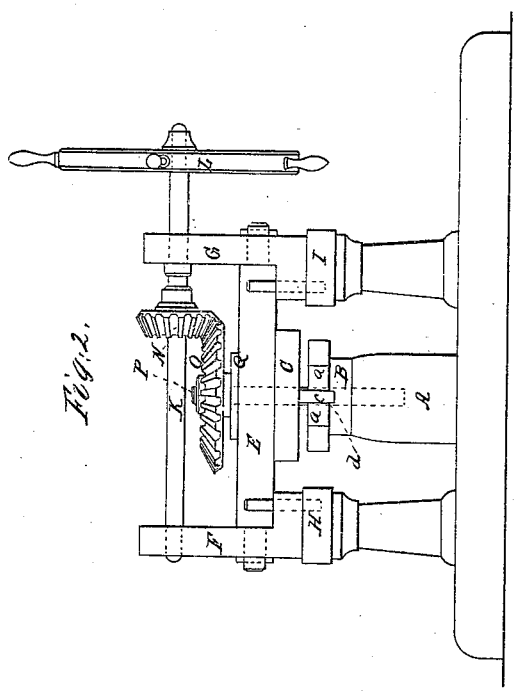
Figure 3:
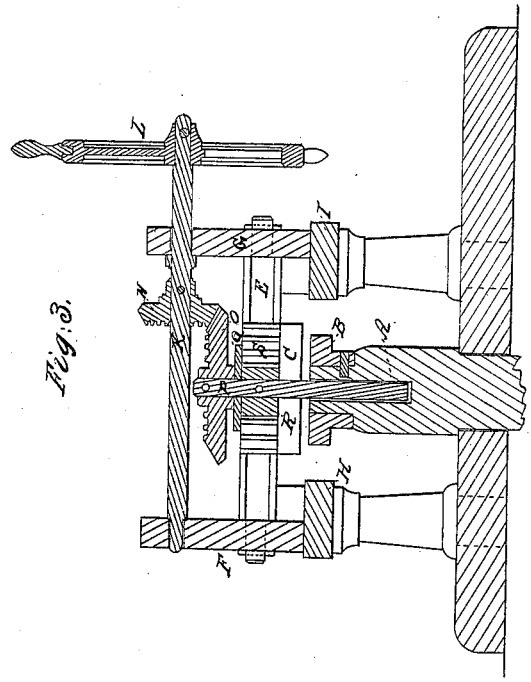
Figure 1:
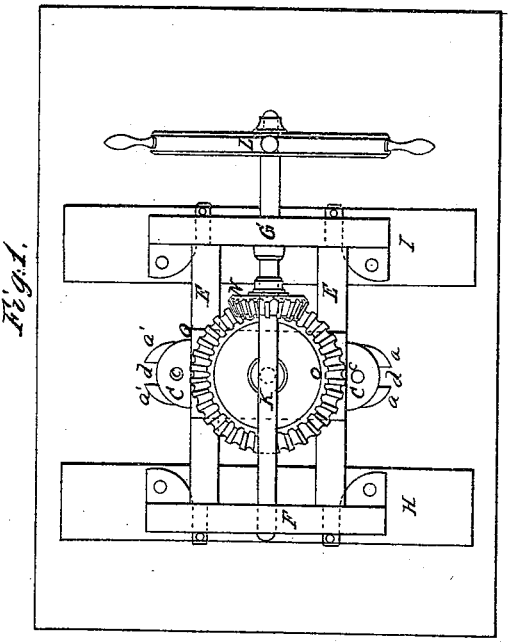
Figure 4:
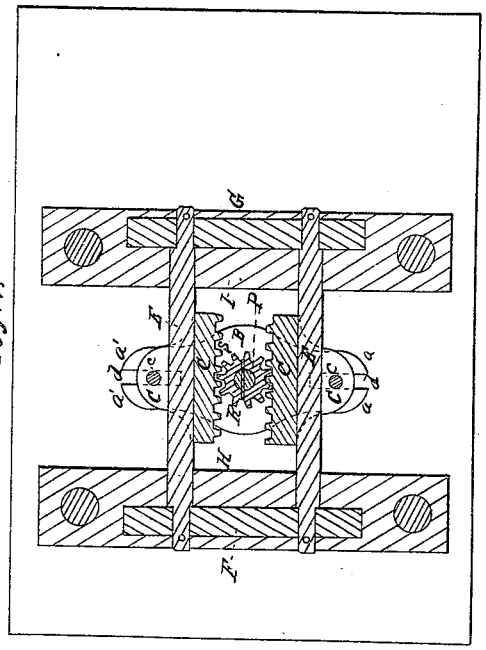

Figure 1, is a top view; Fig. 2, a side elevation; Fig. 3, a longitudinal section, and Fig. 4, a horizontal section of a steering apparatus provided with my improvement.

In these drawings, A, denotes the rudder head, as furnished with a cap or ring, B, provided with two sets of parallel arms $a$, $a$, $a'$, $a'$, projecting from opposite sides of it, and so as to operate with two pins $c$, $c$, that extend down respectively from two slides C, C. The two arms $a$, $a$ or $a'$, $a'$, of each set have their pin, $c$, extending vertically into the space $d$, which is between them, such space being of a width equal to or a little greater than that of the pin. The slides C, C, are arranged between and so as to slide respectively on two parallel stationary bars E, E, that are upheld by two heads or uprights F, G, resting on stanchions H, I, arranged as shown in the drawings. These uprights also support the horizontal shaft, K, of a steering wheel, L.

A bevel pinion, N, is carried by the shaft, K, and engages with a bevel wheel, O, fixed on the upper end of an auxiliary vertical shaft, P, which is supported in a bearing, Q, that is upheld by the bars, E, E. On the lower end of the shaft, P, a spur gear or pinion, R, is affixed and engages with two toothed racks, S, S', respectively carried by the two slides C, C, the whole being as shown in the drawings. By revolving the steering wheel shaft, the slides C, C, will be caused by the mechanism above described to move in opposite directions, at one and the same time so as to cause rotary motion to be imparted to the rudder head either to "port" or "starboard," according to the direction in which the steering wheel is turned.

By means of the two plain toothed racks S, S', the pinion, R, the auxiliary shaft, P, the bevel wheel, O, and the bevel pinion, N, arranged and applied to the shaft, K, and the two slides, C, C, I am enabled to dispense with two right and left screws and nuts whether whole or half nuts as generally applied to the slides and the steering wheel shaft, in either Robinson's steering apparatus, patented September 30th, 1842, Reed's steering apparatus, patented June 5th, 1849, and March 6th, 1855; Chamberlain's steering apparatus, patented July 7th, 1857, or in various others of like nature.

By doing away with the screws I not only lessen the cost of the apparatus, comparatively speaking, but render it quicker in its operations, or in other words quicker to operate the rudder. I also obtain other advantages.

I claim—

The arrangement of the two racks, S, S', their pinion, R, the auxiliary shaft, P, the bevel wheel, O, its pinion N, the steering wheel shaft, K, and the slides, C, C, applied to and for operating the rudder head as specified.

NATHANIEL SNOW, JR.

Witnesses:
R. H. EDDY,
F. R. HALE, Jr.